(12) United States Patent
Egedal et al.

(10) Patent No.: US 9,752,561 B2
(45) Date of Patent: Sep. 5, 2017

(54) DETECTING A PITCH ANGLE ADJUSTMENT FAULT

(71) Applicant: Siemens Aktiengesellschaft, Munich (DE)

(72) Inventors: Per Egedal, Herning (DK); Gustav Hoegh, Herning (DK); Bjarne Skovmose Kallesoee, Bagsvaerd (DK)

(73) Assignee: Siemens Aktiengesellschaft, Munich (DE)

( * ) Notice: Subject to any disclaimer, the term of this patent is extended or adjusted under 35 U.S.C. 154(b) by 308 days.

(21) Appl. No.: 14/561,650

(22) Filed: Dec. 5, 2014

(65) Prior Publication Data

US 2015/0176570 A1 Jun. 25, 2015

(30) Foreign Application Priority Data

Dec. 20, 2013 (EP) .................................... 13198987

(51) Int. Cl.
*F03D 7/02* (2006.01)
*F03D 11/00* (2006.01)
*F03D 7/04* (2006.01)
*F03D 17/00* (2016.01)

(52) U.S. Cl.
CPC ........ *F03D 11/0091* (2013.01); *F03D 7/0224* (2013.01); *F03D 7/044* (2013.01); *F03D 17/00* (2016.05); *F05B 2260/821* (2013.01); *F05B 2260/83* (2013.01); *F05B 2270/328* (2013.01); *Y02E 10/723* (2013.01)

(58) Field of Classification Search
CPC ..... F03D 11/0091; F03D 17/00; F03D 7/0224
USPC ............................................................ 416/61
See application file for complete search history.

(56) References Cited

U.S. PATENT DOCUMENTS

| | | | |
|---|---|---|---|
| 7,679,208 B1 * | 3/2010 | Ko | F03D 7/0224 290/44 |
| 2002/0105189 A1 | 8/2002 | Christenson et al. | |
| 2009/0295159 A1 * | 12/2009 | Johnson | F03D 7/0224 290/44 |
| 2010/0098540 A1 * | 4/2010 | Fric | F03D 7/0224 416/36 |
| 2011/0084485 A1 * | 4/2011 | Miranda | F03D 7/0224 290/44 |
| 2011/0142620 A1 | 6/2011 | Menke et al. | |
| 2011/0158805 A1 | 6/2011 | Jeppesen et al. | |
| 2012/0029892 A1 * | 2/2012 | Thulke | F03D 7/045 703/7 |
| 2012/0119496 A1 | 5/2012 | Siegfriedsen | |
| 2012/0282091 A1 * | 11/2012 | Esbensen | F03D 7/0224 416/1 |
| 2013/0106107 A1 * | 5/2013 | Spruce | F03D 7/0224 290/44 |
| 2013/0259686 A1 * | 10/2013 | Blom | F03D 7/0276 416/1 |

* cited by examiner

*Primary Examiner* — Dwayne J White
*Assistant Examiner* — Aaron R Eastman
(74) *Attorney, Agent, or Firm* — Beusse Wolter Sanks & Maire

(57) ABSTRACT

A method for detecting a rotor blade pitch angle adjustment fault of a rotor blade of a wind turbine is provided, the method includes measuring a rotor blade pitch angle speed; predicting, based on an actual rotor speed, a rotor blade pitch angle speed; indicating a fault, if a first criterion is satisfied, wherein the first criterion is satisfied, if deviation between the measured rotor blade pitch angle speed and the predicted rotor blade pitch angle speed exceeds a speed threshold.

17 Claims, 2 Drawing Sheets

DETECTING A PITCH ANGLE ADJUSTMENT FAULT

CROSS REFERENCE TO RELATED APPLICATIONS

This application claims the benefit of European Application No. EP13198987 filed Dec. 20, 2013, incorporated by reference herein in its entirety.

FIELD OF INVENTION

The present invention relates to a method and to an arrangement for detecting a rotor blade pitch angle adjustment fault of a rotor blade of a wind turbine.

ART BACKGROUND

A wind turbine comprises a wind turbine tower, a nacelle mounted on top of the wind turbine tower, wherein a shaft is supported in a bearing and can rotate within the nacelle. The wind turbine shaft has one or more wind turbine blades connected to it and drives an electrical generator. The rotor blades may be turned or rotated or adjusted around their longitudinal axis, in order to adjust a rotor blade pitch angle, being an angle between a cord line of the rotor blade and a rotor plane being a plane perpendicular to the axis of the shaft which is driven by the rotor blades. For example, when the rotor blade pitch angle is zero, the rotor blades may be adjusted to transfer a maximal amount of wind energy of wind impacting on the rotor blade, in order to produce maximal amount of electrical power. In contrast, when the rotor blade pitch angle is 90°, the impacting wind (assumed to impact in a direction parallel to the rotor axis) will not drive the rotor blades and thus the wind turbine will not produce any energy.

During operation of the wind turbine, it may be required to adjust the pitch angle depending on a rotational speed of the rotor, in dependence of a desired power output (in particular including active power and/or reactive power) and other requirements. Thereby, a pitch servo system may be involved for adjusting the rotor blade pitch angles. However, the pitch servo system may have a fault and may incorrectly adjust the rotor blade pitch angles. In case of such a fault, there may be a risk of damaging components of the wind turbine.

Conventionally, if a fault of the pitch servo system is detected, a safety system is activated and may stop the turbine in a safe manner. In a conventional wind turbine, a safety system may be activated when the rotor speed reaches or exceeds a speed limit. However, it has been observed that detecting a pitch servo system fault in the conventional manner is not reliable in all situations, involving the risk of missing a pitch servo system fault and thereby involving the risk of damaging components of the wind turbine.

There may be a need for a method and for a system for detecting a rotor blade pitch angle adjustment fault which is more reliable than the conventional methods and arrangements and may reduce damaging components of the wind turbine.

SUMMARY OF THE INVENTION

This need may be met by the subject matter according to the independent claims. Advantageous embodiments of the present invention are described by the dependent claims.

According to an embodiment of the present invention, it is provided a method for detecting a rotor blade pitch angle adjustment fault of a rotor blade of a wind turbine, the method comprising measuring a rotor blade pitch angle speed; predicting, based on an actual rotor speed and in particular also rotor acceleration, a rotor blade pitch angle speed; indicating a fault, if a first criterion is satisfied, wherein the first criterion is satisfied, if deviation between the measured rotor blade pitch angle speed and the predicted rotor blade pitch angle speed exceeds a speed threshold.

Thereby, the detecting method may be adapted to detect, when an actual rotor blade pitch angle speed deviates from an intended rotor blade pitch angle speed. A cause of the deviation between the actual rotor blade pitch angle speed and the intended or desired rotor blade pitch angle speed may be a failure of a pitch servo system which, via a controller and/or a hydraulic pitch angle adjustment system, may be responsible for setting or adjusting the rotor blade pitch angles. The failure of the pitch servo system may involve a failure of one or more controllers of the pitch servo system and/or a failure of some mechanical portion or some hydraulic portion of the pitch servo system. For example, a hydraulic line or tubing may be damaged such that a pressure in the hydraulic system may be smaller than an intended pressure thereby hampering or even prohibiting the adjustment of the rotor blade pitch angles via the hydraulic system in a proper manner.

The method may in particular be applied to all rotor blades which are connected to a rotor of the wind turbine. Thereby, all predicted and/or measured quantities, such as the rotor blade pitch angle, the rotor blade pitch angle speed may relate to either an average over all rotor blades or to a maximum over all rotor blades. However, the detecting method may also be applied to a single rotor blade. The method may be implemented in a controller section belonging to a wind turbine controller.

In particular, the method may be (at least partially) implemented in software and a computing section or processing section of a wind turbine controller or a wind turbine controller portion may execute the method.

The rotor blade pitch angle speed may be a speed (or velocity) with which the rotor blade pitch angle changes with time. According to an embodiment of the present invention, the rotor blade pitch angle may be measured (for example in a continuous manner or sampled) over time and the rotor blade pitch angle speed may be derived by taking a derivative (in an analogous manner or in a digital manner) of the measured rotor blade pitch angle. The rotor blade pitch angle may for example be measured using a hydraulic system and/or an encoder. The rotor blade pitch angle speed (and/or the rotor blade pitch angle) may be measured continuously or sampled continuously during operation of the wind turbine.

The rotor blade pitch angle speed which is predicted based at least on the actual rotor speed (i.e. the rotational speed of the shaft to which the rotor blade or the plural rotor blades are connected) may correspond to or may be equal to a derivative of a reference rotor blade pitch angle. The reference rotor blade pitch angle may be the pitch angle intended to be set for the rotor blade and which depends on the rotor speed. The reference blade pitch angle is thereby the rotor blade pitch angle which is expected to be adjusted at the rotor blade, when the wind turbine is running under normal conditions without a failure in the pitch servo system. Predicting the rotor blade pitch angle speed may involve computations and logical and/or arithmetic calculations.

The fault may be indicated for example by outputting a control signal and/or outputting information to a user. Outputting the signal or outputting the information may involve outputting electrical and/or optical signals. The fault may also be indicated by activating a safety system. Thereby, in particular indicating the fault may involve outputting a control signal to a safety system.

The pitch speed and/or pitch angle may normally be adjusted by a controller to maintain a given rotational speed of the rotor. If the knowledge of the controller (form, parameters, etc.) is included in the safety system, it may be possible to evaluate, if the controller response (measured pitch speed or angle) is reasonable provided a measurement of the rotor speed. If the measured pitch speed or measured angle deviates, above a given threshold, from the expected value, this may indicate a fault condition and the safety system may be activated.

The invention may be applied to any controller controlling the pitch angle (in particular calculating the reference pitch angle) under normal operation conditions. In particular, the controller may be a proportional-integral controller (PI-controller) which controls the pitch angle dependent on the rotational speed of the rotor shaft. In another embodiment, controllers different from a PI-controller may be employed. Such a controller controlling the pitch angle may output a reference pitch angle dependent on the rotational speed of the rotor shaft.

The detection method may have less false positives and may be quicker than conventional methods. For example, when an actual rotor blade pitch angle is deviating from an intended rotor blade pitch angle and also an actual rotor blade pitch angle speed deviates from an intended (or predicted) blade pitch angle speed, this may be detected right away or immediately. In contrast, that the rotational speed of the rotor shaft deviates or exceeds a rotational speed limit may take a while after the rotor blade pitch angle and the rotor blade pitch angle speed have been deviating (for a time interval greater 0 s) from their respective desired or intended or predicted values. Thereby, the control method may in a faster manner detect a failure of a pitch servo system. Furthermore, the method may largely be implemented in software and may not require major re-arrangements or extensions of hardware. Furthermore, input values required by the method may be available or measured in a conventional wind turbine.

According to an embodiment of the present invention, the measured rotor blade pitch angle speed is taken as an average rotor blade pitch angle speed or a maximum rotor blade pitch angle speed among at least two, in particular all, rotor blades of the wind turbine.

Taking the average or the maximum rotor blade pitch angle speed among at least two rotor blades of the wind turbine may even detect a failure involving only one of the rotor blades, thereby improving the method (increasing robustness) and reducing a risk of damaging components of the wind turbine. For example, even if only one rotor blade is affected from a rotor blade pitch angle adjustment fault or failure, the maximum of the rotor blade pitch angle speed among all rotor blades of the wind turbine may correspond to the rotor blade pitch angle speed of the rotor blade affected by the servo system fault. Thus, also such a servo system fault affecting only one or only few (but not all) rotor blades may be detected. Also a servo fault on all rotor blades may be detected. If all blades are e.g. stuck at a constant pitch angle then both the individual or average pitch speed may deviate from the expected pitch speed and trigger indicating the fault.

An advantage of calculating the speed as the mean speed of multiple (or all) blades could be to reduce noise (from the derivative of the angle measurement) or allow for some individual pitch control (IPC) where each blade may have an additional cyclic pitch angle added to the collective pitch signal for the PI controller. Taking the average may remove some of the contribution on the added IPC signal, that would otherwise be detected at as a unexpected pitch speed deviation.

According to an embodiment of the present invention, predicting the rotor blade pitch angle speed is further based on a rotor acceleration and/or a rotor blade pitch angle of the respective rotor blade.

According to this embodiment, the rotor blade pitch angle speed may in particular be derived based on a predicted pitch angle which may be equal to a reference pitch angle which is calculated under normal operation conditions and which is dependent on a rotational speed of the rotation shaft and which may also be dependent (via a gain function) on the rotor blade pitch angle (or a filtered version therefrom). Taking also into account the rotor acceleration (which may be derived as a derivative of the rotor speed) and/or the rotor blade angle may improve the reliability and accuracy of detecting the rotor blade pitch angle adjustment fault.

According to an embodiment of the present invention, predicting the rotor blade pitch angle speed includes computing a derivative of a predicted rotor blade pitch angle.

The predicted rotor blade pitch angle may correspond or may be equal to a reference blade pitch angle which may be derived in a conventional controller controlling the blade pitch angle. Thereby, the method may take advantage of quantities which may be available in a conventional system. The derivative may be taken by taking a difference between two successive sample values of the rotor blade pitch angle and dividing the difference by the time between the two sampled values. Alternatively or additionally, the derivative may be determined in other ways, including using an analog circuit.

According to an embodiment of the present invention, the predicted rotor blade pitch angle is derived based on a deviation between a reference rotor speed and the actual rotor speed.

In particular, the reference rotor speed may be also referred to as a nominal rotor speed which may be the intended rotor speed under normal operation for producing electric energy. In particular, when the actual rotor speed equals the reference rotor speed, the predicted rotor blade pitch angle (being equal to the reference rotor blade pitch angle) may be zero. However, when the actual rotor speed exceeds the reference rotor speed, the predicted rotor blade pitch angle (or the reference rotor blade pitch angle) may increase when the difference between the actual rotor speed and the reference rotor speed increases. Thereby, when the actual rotor speed exceeds the reference rotor speed, the driving force of the wind impacting on the rotor blade adjusted to the reference rotor blade pitch angle may decrease thereby having an effect to decrease the rotational speed of the rotor shaft.

In particular, the deviation between the reference rotor speed and the actual rotor speed may act as an error term which is input to a controller, in particular a PI-controller, wherein the controller has a proportional term and an integrative term defined by controller parameters. Furthermore, a sum of a proportional term and an integrative term may be multiplied by a gain scheduling function which may depend on the actual rotor blade pitch angle in particular a filtered version of a rotor blade pitch angle.

According to an embodiment of the present invention, the predicted rotor blade pitch angle is derived based on an instantaneous and a time integrated deviation between a reference rotor speed and the actual rotor speed.

Thereby, the predicted rotor blade pitch angle may in particular be derived as a sum of an instantaneous deviation and a time integrated deviation between the reference rotor speed and the actual rotor speed, wherein this sum may further be multiplied by a gain scheduling function which may be dependent on the rotor blade pitch angle or a filtered version thereof. Thereby, the implementation may be simplified.

According to an embodiment of the present invention, the predicted rotor blade pitch angle $\vartheta_{ref}$ is derived according to:

$$\vartheta_{ref} = G(\vartheta) \cdot \left( K_p \delta + \int_0^\tau K_i \delta\, dt \right)$$

wherein
- $G(\vartheta)$ is a gain function depending on a filtered blade pitch angle $\vartheta$
- $\delta$ is the deviation between the reference rotor speed and the actual rotor speed
- $K_p$ is a proportional gain
- $K_i$ is an integrative gain.

The proportional gain and/or the integrative gain may be constant factors which may be adapted such that when the actual rotor speed equals to the reference rotor speed, the pitch angle or the reference pitch angle or the predicted pitch angle equals to zero. The equilibrium pitch angle may depend on the wind speed and may not be zero at e.g. high wind speed. The pitch speed may be zero, if the reference speed match the measured speed.

A conventional PI-controller may be employed, thereby simplifying the method.

According to an embodiment of the present invention, if the predicted rotor blade pitch angle speed is greater than a maximum controller pitch angle speed, the predicted rotor blade pitch angle speed is reset to the maximum controller pitch angle speed, the maximum controller pitch angle speed being a maximum speed the controller is able to change the pitch angle.

Thereby, an unrealistic predicted rotor blade pitch angle speed may be replaced with the maximum controller pitch angle speed, in order to improve the reliability of the method.

According to an embodiment of the present invention, a fault is not indicated, if the measured rotor blade pitch angle speed, that is in a direction to increase the rotor blade pitch angle, is greater than a minimum rotor blade pitch angle speed threshold.

Thereby, it may be ensured that the detection method does not indicate a fault, if the turbine controller is currently in a process of slowing down or stopping the rotor. In such an event where the turbine controller behaves as expected the safety system should not take over the control of a well functioning turbine controller.

The pitch angle may only be continuously increasing (positive speed) in normal operations if the wind speed is continuously increasing.

Therefore, if the turbine is pitching towards stop with a certain pitch speed (Pitch_Speed_Min), the pitch speed monitor may be deactivated.

According to an embodiment of the present invention, a fault is not indicated, if the rotor speed is smaller than a minimal rotor speed threshold. Thereby, it may be ensured that the detection method only indicates a fault, when the turbine is running, i.e. the rotor speed is greater than a minimal rotor speed threshold, e.g. cut-out rotor speed. The minimal rotor speed threshold (cut-out rotor speed) may e.g. be around 2-6 RPM depending on turbine type.

According to an embodiment of the present invention, the fault is indicated, if at least one of the first criterion and a second criterion is satisfied, wherein the second criterion is satisfied, if the rotor speed is greater than a maximum rotor speed threshold.

Thereby, the fault is indicated, if for example the first criterion and the second criterion are satisfied. In another embodiment, the fault is indicated, if the first criterion is satisfied but the second criterion is not satisfied. In another embodiment, the fault is indicated, if the first criterion is not satisfied and the second criterion is satisfied. Including also a second criterion may improve the reliability of the method.

According to an embodiment of the present invention, the fault is indicated, if at least one of the first criterion and a second criterion and a third criterion is satisfied, wherein the third criterion is satisfied, if the following holds:

rotor speed>PitchRunAwayEnableSpeed
AND
(ABS(Pitch_A−Pitch_B)>MaxPitchDeviation) OR
ABS(Pitch_B−Pitch_C)>MaxPitchDeviation) OR
ABS(Pitch_A−Pitch_C)>MaxPitchDeviation))
wherein
PitchRunAwayEnableSpeed is a rotor speed threshold, e.g. cut-out rotor speed.
Pitch_A is the rotor pitch angle of a first rotor blade
Pitch_B is the rotor pitch angle of a second rotor blade
Pitch_C is the rotor pitch angle of a third rotor blade, the first, the second and the third rotor blade being connected to the shaft of the wind turbine,
MaxPitchDeviation is a pitch angle deviation threshold.

In particular, one, two or three of the first, the second and the third criterion may be required to be satisfied in order to indicate the fault. PitchRunAwayEnableSpeed (Cut-out speed) may e.g. be 2-6 RPM, MaxPitchDeviation may e.g. be 2 to 10 deg. However, these values may vary depending on turbine type etc.

According to an embodiment of the present invention, indicating the fault further comprises activating a safety system causing increasing the pitch angle.

Activating the safety system may be performed by transmitting a signal (electrical and/or optical) from the controller performing the method to the safety system. The safety system may be a system separate and independent of any controller or any software and may affect a mechanical equipment to change the pitch angle, in particular to increase the pitch angle such that a driving force of the impacting wind is reduced.

According to an embodiment of the present invention, it is provided a software program, which is adapted, when executed on a computing system, such as a computer, to carry out a method for detecting a rotor blade pitch angle adjustment fault according to one or more of the embodiments described above.

It should be understood that features individually or in any combination disclosed, described, employed or applied to a method for detecting a rotor blade pitch angle adjustment fault may also, individually or in any combination, apply to or provided with an arrangement for detecting a rotor blade pitch angle adjustment fault according to an embodiment of the present invention and vice versa.

According to an embodiment of the present invention, it is provided an arrangement for detecting a rotor blade pitch angle adjustment fault of a rotor blade of a wind turbine, the arrangement comprising a reception section adapted to receive a measured rotor blade pitch angle speed and to receive an actual rotor speed; a computing section adapted to predict, based on the actual rotor speed, a rotor blade pitch angle speed and to determine that a first criterion is satisfied, if a deviation between the measured rotor blade pitch angle speed and the predicted rotor blade pitch angle speed exceeds a speed threshold; and an output section adapted to indicate a fault, if the first criterion is satisfied.

The arrangement may be a portion of a wind turbine controller. The arrangement may comprise a processor (in particular within the computing section) which performs arithmetic/logical operations. The computing section may in particular comprise a reader for reading a software program which carries instructions to carry out a method for detecting a rotor blade pitch angle adjustment fault. The software program may be read into a storage of the computing section and may be executed by the computing section. The output section may be adapted to transmit a control signal to a safety system. The arrangement may, according to particular embodiments, also comprise measurement equipment to at least measure the rotor blade pitch angle and/or rotor blade pitch angle speed and/or rotor speed.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
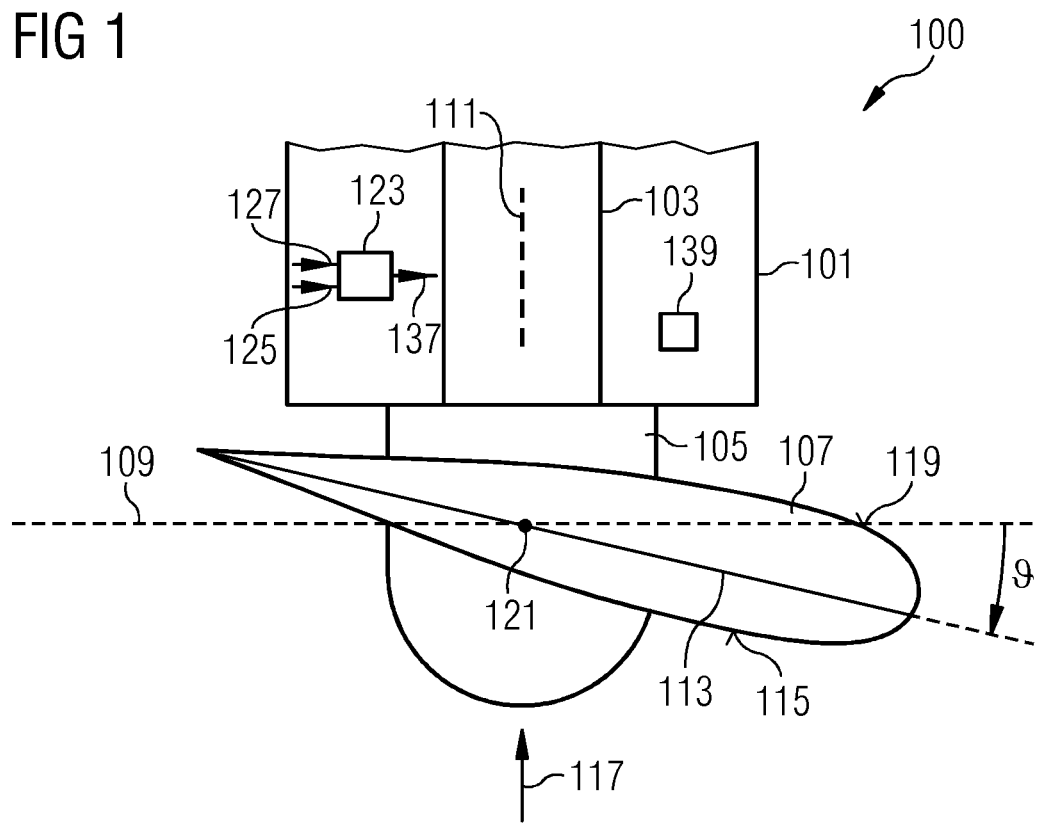
FIG. 1 schematically illustrates a top view of a wind turbine comprising an arrangement for detecting a rotor blade pitch angle adjustment fault according to an embodiment of the present invention.

The illustration in the drawings is in schematic form. It is noted that in different figures, similar or identical elements are provided with the same reference signs or with reference signs, which are different from the corresponding reference signs only within the first digit.

The wind turbine 100 illustrated in a top view in FIG. 1 comprises a nacelle 101 in which a rotor shaft 103 is supported in a not illustrated bearing and can rotate within the nacelle 101. To the rotor shaft 103, a hub 105 is connected to which one or more rotor blades 107 are attached, wherein only one rotor blade 107 is illustrated in FIG. 1. The rotor blade 107 rotates in a rotation plane 109 which is perpendicular to an axis 111 of the rotor shaft 103. The rotor blade 107 has a particular cross sectional profile or airfoil having a, relative to a chord line 113, thinner side 115 facing the wind 117 and having a thicker side 119 directed away from the wind 117. The rotor blade 107 can be rotated around a longitudinal axis 121 of the rotor blade 107, in order to adjust a rotor blade pitch angle σ which is the angle between the rotation plane 109 and the chord line 113.

The partially illustrated wind turbine 100 further comprises an arrangement 123 for detecting a rotor blade pitch angle adjustment fault. The arrangement 123 receives input signals 125, 127 which may comprise a measured rotor blade pitch angle speed 125, i.e. the velocity or speed with which the rotor blade pitch angle σ of the rotor blade 107 changes with time. The rotor blade pitch angle speed 125 may for example be measured using an encoder which basically measures the rotor blade pitch angle $\vartheta$ and forms a derivative of this measured rotor blade pitch angle $\vartheta$. The arrangement 123 further receives an actual rotor speed 127.

Figure 2:
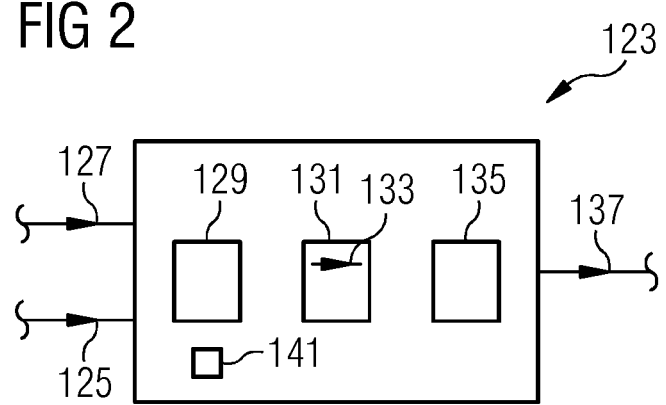
FIG. 2 schematically illustrates an arrangement for detecting a rotor blade pitch angle adjustment fault according to an embodiment of the present invention which is adapted to carry out a method for detecting a rotor blade pitch angle adjustment fault according to an embodiment of the present invention.

The arrangement 123 is in further detail illustrated in FIG. 2. The arrangement 123 for detecting a rotor blade pitch angle adjustment fault of the rotor blade 107 (or also one or more other rotor blades connected to the wind turbine hub 105) comprises a reception section 129 which is adapted to receive a measured rotor blade pitch angle speed 125 and also adapted to receive an actual rotor speed 127 being the rotational speed with which the rotor 103 rotates around its rotation axis 111. Further, the arrangement 123 comprises a computing section 131 which is adapted to predict, based on the actual rotor speed 127, a rotor blade pitch angle speed and to determine that a first criterion is satisfied, if a deviation between the measured rotor blade pitch angle speed 125 and the predicted rotor blade pitch angle speed 133 (calculated within the computing section 131) exceeds a speed threshold. Furthermore, the arrangement 123 comprises an output section 135 which is adapted to indicate a fault (comprising signals 137) if the first criterion is satisfied.

The signal 137 may thereby comprise a control signal for activating or controlling a safety system 139 which is then adapted to increase the rotor blade pitch angle $\vartheta$ such that the driving force caused by the impacting wind 117 decreases or even vanishes.

The predicted rotor blade pitch angle speed may be derived from a predicted or referenced rotor blade pitch angle, as defined in the equation below:

$$\vartheta_{ref} = G(\vartheta) \cdot \left( K_p \delta + \int_0^t K_i \delta \, dt \right) \quad \text{(eq. 1)}$$

wherein $G(\vartheta)$ is a gain function depending on a filtered blade pitch angle $\vartheta$ δ is the deviation between the reference rotor speed and the actual rotor speed $K_p$ is a proportional gain $K_i$ is an integrative gain.

Thereby, $\vartheta_{ref}$ is the reference pitch angle, $K_p$ is the proportional gain, $K_i=K_p/T_i$ is the integral gain and $\delta=\Omega-\Omega_{ref}$, wherein $\Omega$ is the rotor speed of the rotor 103 and $\Omega_{ref}$ is the rated rotor speed or the reference rotor speed or nominal rotor speed, being the rotor speed of the normal energy production operation of the wind turbine 100. Thereby further, $G=G(\vartheta)$ is a gain scheduling function based on the pitch angle $\vartheta$.

The gain scheduling function is defined as:

if $\vartheta > \vartheta_2$ $$G=K_1/(\lambda \vartheta_2 + \vartheta_{offset})$$

else if $\vartheta_2 > \vartheta > \vartheta_1$ $$G=K_1/(\lambda \vartheta + \vartheta_{offset})$$

else $$G=1$$

where $$\vartheta = (K_2 - K_1)/(\vartheta_2 - \vartheta_1)$$

$$\vartheta_{offset} = K_1 \vartheta \lambda \vartheta_1$$

All parameters $K_1$, $K_2$, $\theta_1$ and $\theta_2$ can be based on controller input parameters or tuned based on parameter studies.

From the reference rotor blade pitch angle $\vartheta_{ref}$, the rotor blade pitch angle speed may be predicted by differentiation, as shown below and assuming that $$\frac{dG}{dt} \approx 0:$$ (eq. 2)

$$\frac{d\theta}{dt} = G\left(K_p \frac{d\Omega}{dt} + K_1(\Omega - \Omega_{ref})\right)$$

To ensure that the predicted pitch speed is not exceeding the maximum controller pitch speed, a check may be made if $d\vartheta/dt > $ pitch_speed_max pitch_speed_predict=pitch_speed_max else pitch_speed_predict=$d\vartheta/dt$ According to an embodiment of the present invention, the detection method comprises a pitch run away monitor which compares the pitch speed predicted by the above equation (eq. 1) based on rotor speed, acceleration and pitch position and compares this predicted pitch speed to the actual measured pitch speed, which may for example be based on a measured position, such as using a hydraulic system, or an encoder.

Thereby, the following is calculated:

Pitch_Speed_Error=Pitch_Speed_Predicted−Pitch_Speed_Measured

The measured pitch speed can be taken as the average pitch speed of the blades or as the maximum pitch speed among the blade 107 connected to the hub 105 of the wind turbine 100 illustrated in FIG. 1. If the Pitch_Speed_Error becomes larger than some threshold, a safety system, such as safety system 139 illustrated in FIG. 1, may be activated.

If Pitch_Speed_Error>Pitch_Speed_Error_Max (first criterion)

activate safety system

To ensure that the pitch runaway monitor is not triggered, if the wind turbine is currently in the process of slowing down or stopping the rotor, the following check is performed:

If Pitch_Speed_Measured Pitch_Speed_Min

Pitch_Speed_Error=−1

That is, if the turbine is pitching towards stop with a certain pitch speed Pitch_Speed_Min, the pitch speed monitor is deactivated.

To ensure that the pitch speed monitor is only active, when the turbine is running, the following check of rotor speed may be performed:

If Rotor_Speed<Rotor_Speed_Min

Pitch_Speed_Error=−1

The above criterion regarding the Pitch_Speed_Error may also be referred to as a first criterion.

Furthermore, additionally to the first criterion, a second criterion may be defined and may be monitored within the method for detecting the fault:

Rotor_Speed>Over_Speed_Limit (second criterion)

If the rotor speed is above a threshold, the safety system may be activated.

Furthermore, additionally, a third criterion may be evaluated, as follows according to a Pitch position deviation monitor (third criterion):

rotor speed>PitchRunAwayEnableSpeed

AND (ABS(Pitch_A−Pitch_B)>MaxPitchDeviation) OR

ABS(Pitch_B−Pitch_C)>MaxPitchDeviation) OR

ABS(Pitch_A−Pitch_C)>MaxPitchDeviation))

wherein

PitchRunAwayEnableSpeed is a rotor speed threshold

Pitch_A is the rotor pitch angle of a first rotor blade

Pitch_B is the rotor pitch angle of a second rotor blade

Pitch_C is the rotor pitch angle of a third rotor blade, the first, the second and the third rotor blade being connected to the shaft of the wind turbine, MaxPitchDeviation is a pitch angle deviation threshold If the rotor speed is above a threshold and the deviation between the pitch angle of the blade exceeds a threshold, the safety system may be activated.

The detecting method, which may be carried out by the arrangement 123 illustrated in FIGS. 1 and 2 may be more robust, may offer earlier detection and less faults false positive activations of the safety system compared to conventional methods.

The arrangement 123 may further comprise a program reader 141 which may be adapted to read program code (compiled or not compiled) comprising instructions which, when carried out by the arrangement 123 causes performing or performs the detection method according to embodiments of the present invention described above.

Figure 3:
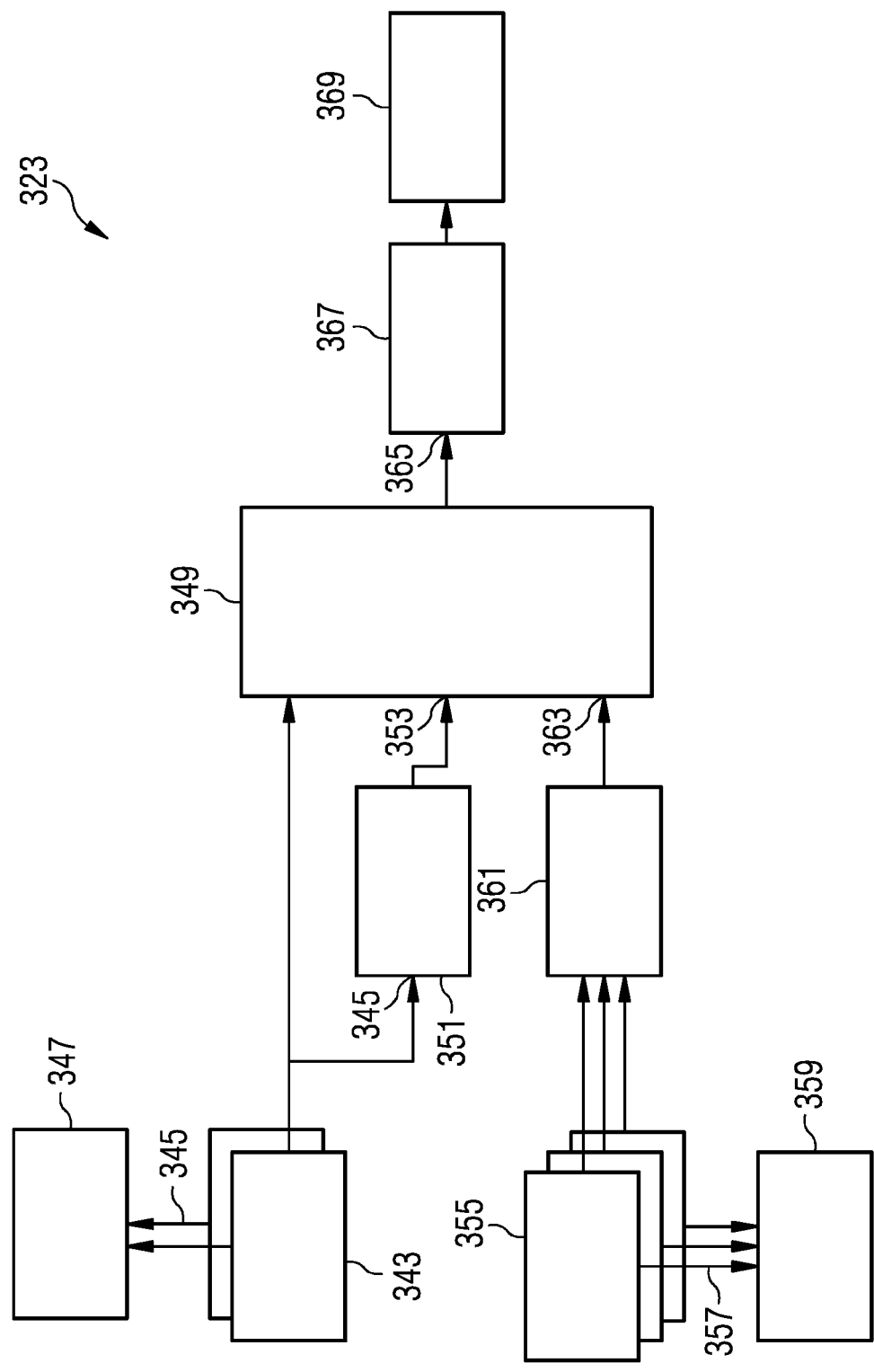
FIG. 3 illustrates a schematic diagram of an arrangement for detecting a rotor blade pitch angle adjustment fault according to an alternative embodiment of the present invention.

FIG. 3 illustrates a schematic diagram of an arrangement for detecting a rotor blade pitch angle adjustment fault according to an alternative embodiment of the present invention.

The arrangement 323 comprises a speed sensor 343 which senses the rotational speed of the rotor 103. The measurement signals 345 are transmitted to a speed sensor diagnostic 347 and also to a monitoring matrix 349. From the rotational speed measurement values 345, a block 351 calculates the acceleration 353 of the rotational speed of the rotor 103. The acceleration of the rotor speed is also input into the monitoring matrix 349. Failsafe pitch sensors 355 sense or detect rotor blade pitch angles $\vartheta$ and output the rotor blade pitch angles 357 to a pitch signal diagnostic 359 and also to a block 361 which calculates the rotor blade pitch angle speed 363 from the pitch angles 357.

Thereby, the monitoring matrix 349 may indicate a fault 365 under the following conditions:

Speed monitoring:
Rotor speed<rotor speed_1
Pitch runaway:

---

(
Rotor speed > rotor speed_2 AND
Rotor acceleration > rotor acceleration_1 AND
piston speed < piston speed_1
)
OR ABS (piston speed) > piston speed_2

---

The fault signal is transmitted to a contactor 367 which then sends a control signal to the emergency pitch function 369.

The diagnostic monitoring according to this embodiment of the present invention monitors the piston speed and may be done in a failsafe manner, as the interface is based on pulsed signal on a balanced transmission line (RS485 hardware). The length between the start and the stop pulse is giving the position of the piston. If too many or too few pulses are received within the cycle time, the sensor will be seen as faulty.

By detecting the fault situation or the pitch action related to the condition of the rotor speed and rotor acceleration instead of a rotor overspeed detection may make is possible to react much earlier and before the rotor speed reaches a critical limit. Thereby, the controller fault situation is not giving design driving loads and hereby material cost may be saved. Another advantage of the control method may be that a control failure mode may be precisely detected. Other detection methods, e.g. acceleration as a function of speed may not be able to distinguish between a pitch runaway and a grid drop situation, in contrast to the method according to this embodiment of the present invention.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method for detecting a rotor blade pitch angle adjustment fault of a rotor blade of a wind turbine, the method comprising:
measuring a rotor blade pitch angle speed during operation of the wind turbine wherein the rotor blade pitch angle speed is a speed or velocity with which a rotor blade pitch angle changes with time;
predicting, based on an actual rotor speed, a predicted rotor blade pitch angle speed; and
indicating a fault, if a first criterion is satisfied,
wherein the first criterion is satisfied, if deviation between the measured rotor blade pitch angle speed and the predicted rotor blade pitch angle speed exceeds a speed threshold wherein indicating the fault further comprises activating a safety system which increases the rotor blade pitch angle.

2. The method according to claim 1, wherein the measured rotor blade pitch angle speed is taken as an average rotor blade pitch angle speed or a maximum rotor blade pitch angle speed among at least two rotor blades of the wind turbine.

3. The method according to claim 1, wherein predicting the predicted rotor blade pitch angle speed is further based on a rotor acceleration and/or the rotor blade pitch angle of a respective rotor blade.

4. The method according to claim 1, wherein predicting the predicted rotor blade pitch angle speed includes computing a derivative of a predicted rotor blade pitch angle.

5. The method according to claim 1, wherein the predicted rotor blade pitch angle speed is derived based on a deviation between a reference rotor speed and the actual rotor speed.

6. The method according to claim 1, wherein the predicted rotor blade pitch angle speed is derived based on an instantaneous and a time integrated deviation between a reference rotor speed and the actual rotor speed.

7. The method according to claim 1, wherein the predicted rotor blade angle speed is derived based on a predicted rotor blade pitch angle ($\vartheta_{ref}$) defined according to:

$$\vartheta_{ref} = G(\vartheta) \cdot \left( K_p \delta + \int_0^\tau K_i \delta \, dt \right)$$

wherein
G($\vartheta$) is a gain function depending on a filtered blade pitch angle $\vartheta$,
$\delta$ is a deviation between a reference rotor speed and the actual rotor speed,
$K_p$ is a proportional gain, and
$K_i$ is an integrative gain.

8. The method according to claim 1, wherein,
if the predicted rotor blade pitch angle speed is greater than a maximum controller pitch angle speed, the predicted rotor blade pitch angle speed is reset to the maximum controller pitch angle speed, the maximum controller pitch angle speed being a maximum speed the controller is able to change the pitch angle.

9. The method according to claim 1, wherein
a fault is not indicated, if the measured rotor blade pitch angle speed, that is in a direction to increase the rotor blade pitch angle, is greater than a minimum rotor blade pitch angle speed threshold.

10. The method according to claim 1, wherein
a fault is not indicated, if the rotor speed is smaller than a minimal rotor speed threshold.

11. The method according to claim 1, wherein
the fault is indicated, if at least one of the first criterion and a second criterion is satisfied,
wherein the second criterion is satisfied, if the rotor speed is greater than a maximum rotor speed threshold.

12. The method according to claim 1,
wherein the fault is indicated, if at least one of the first criterion and a second criterion and a third criterion is satisfied,
wherein the second criterion is satisfied, if the rotor speed is greater than a maximum rotor speed threshold,
wherein the third criterion is satisfied, if the following holds:
rotor speed>PitchRunAwayEnableSpeed
AND
(ABS(Pitch_A_Pitch_B)>MaxPitchDeviation) OR
ABS(Pitch_B_Pitch_C)>MaxPitchDeviation) OR
ABS(Pitch_A_Pitch_C)>MaxPitchDeviation))
wherein
the PitchRunAwayEnableSpeed is a rotor speed threshold,
the Pitch_A is the rotor pitch angle of a first rotor blade, the Pitch_B is the rotor pitch angle of a second rotor blade, the Pitch_C is the rotor pitch angle of a third rotor blade, the first, second and third rotor blades being connected to a shaft of the wind turbine, and the MaxPitchDeviation is a pitch angle deviation threshold.

13. A software program stored on a non-transitory computer-readable medium, adapted, when executed on a computing system, to carry out a method according to claim 1.

14. The method according to claim 1, wherein the measured rotor blade pitch angle speed is taken as an average rotor blade pitch angle speed or a maximum rotor blade pitch angle speed among all rotor blades of the wind turbine.

15. The method according to claim 1, wherein the measured rotor blade pitch angle speed is continuously measured or continuously sampled during the operation of the wind turbine.

16. A wind turbine controller comprising: an arrangement including a processor for detecting a rotor blade pitch angle adjustment fault of a rotor blade of a wind turbine, the arrangement of the wind turbine controller configured to:

receive a measured rotor blade pitch angle speed and to receive an actual rotor speed wherein the measured rotor blade pitch angle speed is a speed or velocity with which a rotor blade pitch angle changes with time:

predict, based on the actual rotor speed, a predicted rotor blade pitch angle speed and determine that a first criterion is satisfied, if a deviation between the measured rotor blade pitch angle speed and the predicted rotor blade pitch angle speed exceeds a speed threshold; and transmit a signal to a safety system which indicates a fault, if the first criterion is satisfied wherein the safety system causes a change in the rotor blade pitch angle of the rotor blade.

17. The wind turbine controller according to claim 16, wherein the predicted rotor blade angle speed is derived based on a predicted rotor blade pitch angle ($\vartheta_{ref}$) defined according to:

$$\vartheta_{ref} = G(\vartheta) \cdot \left( K_p \delta + \int_0^t K_i \delta \, dt \right)$$

wherein $G(\vartheta)$ is a gain function depending on a filtered blade pitch angle $\vartheta$, $\delta$ is a deviation between a reference rotor speed and the actual rotor speed, $K_p$ is a proportional gain, and $K_i$ is an integrative gain.

* * * * *